United States Patent

Whitehead et al.

[15] 3,641,502

[45] Feb. 8, 1972

[54] DATA RECORDING APPARATUS

[72] Inventors: Cecil Thomas Whitehead, Crowthorne; Anthony Francis Ewart Critchley, Kingston, both of England

[73] Assignee: International Computers Limited, London, England

[22] Filed: Apr. 17, 1970

[21] Appl. No.: 29,579

[30] Foreign Application Priority Data

Apr. 18, 1969 Great Britain........................19,808/69

[52] U.S. Cl...........................................................340/172.5

[51] Int. Cl...........................................................G11b 13/00

[58] Field of Search..............340/172.5, 174.1; 179/100.2 E, 179/100.2 RE, 100.2

[56] References Cited

UNITED STATES PATENTS

| | | | |
|---|---|---|---|
| 3,293,613 | 12/1966 | Gabor | 340/172.5 |
| 3,295,853 | 1/1967 | Teh Yuan Cheng | 179/100.2 E X |
| 3,333,247 | 7/1967 | Hadley et al. | 340/172.5 |
| 3,402,350 | 9/1968 | Shellabarger | 179/100.2 RE |
| 3,406,378 | 10/1968 | Bradford | 340/172.5 |
| 3,415,956 | 12/1968 | Goji Uchikoshi | 179/100.2 E |
| 3,482,230 | 12/1969 | Girling | 340/174.1 |

*Primary Examiner*—Gareth D. Shaw
*Assistant Examiner*—R. F. Chapvran
*Attorney*—Misegades & Douglas

[57] ABSTRACT

A data recording apparatus includes two magnetic recording heads which are spaced apart along the length of an exchangeable magnetic recording tape. A switch normally connects an input data device to the first recording head such that data is recorded in a normal fashion. When it has become necessary to exchange a new tape for an old one, the incoming data is switched to a store where it is held as the tapes are exchanged. When a new tape is ready to record data, the switch is returned to its normal position such that data in the store is recorded by the second recording head concurrently with incoming data being recorded by the first recording head. The heads are spaced apart by a distance such that stored data recorded by the second recording head does not overlap incoming data recorded by the first head.

5 Claims, 2 Drawing Figures

INVENTOR

BY

ATTORNEY

DATA RECORDING APPARATUS

BACKGROUND OF THE INVENTION

This invention relates to data recording apparatus.

Apparatus for recording data continuously over a long period is well known. Such apparatus may be used, for example, in conjunction with a meter for recording the consumption of gas, or electricity, or the rate of flow of liquid in a pipe. The data is usually recorded at fixed time intervals, such as once per minute, or once every 5 minutes. The value of the particular variable which is recorded at the end of any interval may be the instantaneous value, or the integrated value over that interval.

One known form of recording apparatus employs a magnetic tape, or film, which is moved continuously past a magnetic recording head or is stepped along by a predetermined amount for each interval of time. Conveniently, the magnetic medium is wound on to a takeup reel from a supply reel. When all the magnetic medium has been wound on to the takeup reel, this reel must be removed, a new supply must be threaded through the feeding mechanism. This replacement of the medium may take a time equal to several recording intervals. Hence, the data occurring during such intervals would normally be lost. One solution is to switch the data to a standby recorder during the period required for changing the medium on the main recorder. The requirement for a standby recorder obviously increases the cost of the installation. In addition, it complicates the subsequent processing of the recorded data, because the data on the standby medium has to be combined with the data on the medium from the main recorder. This is particularly inconvenient if one recorder is used as a standby for several main recorders in turn.

SUMMARY

According to the invention data recording apparatus for recording input data includes an exchangeable recording medium, means for feeding the medium past spaced first and second recording means, means for normally applying the input data to the first recording means, a data store connected to the second recording means, means for applying the input data to the store during the period when a new recording medium is being exchanged for the old recording medium, and means for causing the stored data and input data to be recorded concurrently on the new medium by the second and first recording means, respectively, the data store being capable of storing all the input data which occurs during the period in which the medium is exchanged, and the second recording means being spaced downstream of the first recording means by such a distance that the stored data is recorded without overlapping the recording of the input data.

BRIEF DESCRIPTION OF THE DRAWINGS

The invention will now be described, by way of example, with reference to the accompanying drawing, in which.

DETAILED DESCRIPTION OF THE PREFERRED EMBODIMENT

Figure 1:
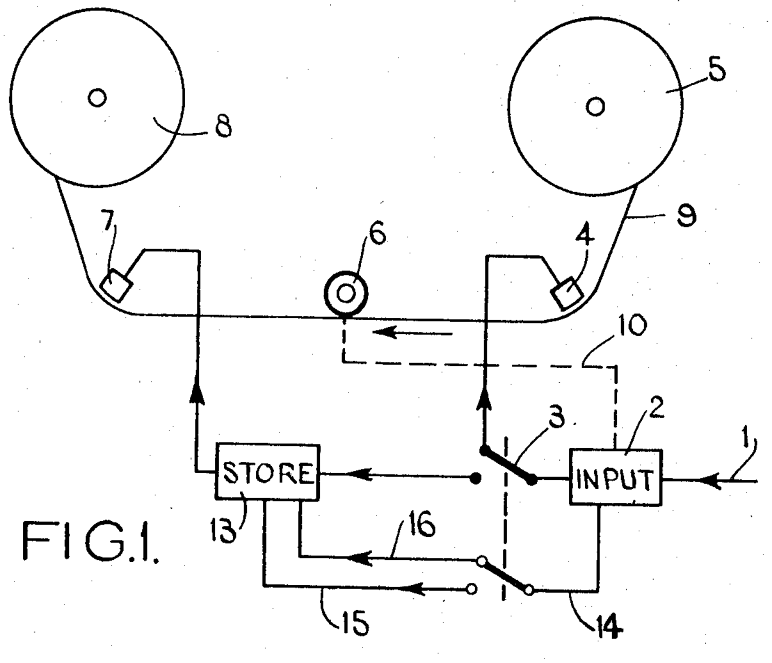
FIG. 1 is a schematic diagram of a magnetic tape data recorder.

Input data to be recorded is applied as electrical signals to an input unit 2 over an input line 1. The input unit 2 may, if desired, convert analogue signals on line 1 to digital form, encode input signals to binary coded decimal form, etc. Such analogue to digital converters are well known in the art and the detailed construction of the particular converter employed forms no part of the present invention.

The output signals from the unit 2 can pass via a switch 3, which is normally in the position shown, to a magnetic recording head 4. A magnetic tape 9 passes from a supply reel 5, over the head 4, a driving capstan 6, a second recording head 7, and on to a takeup reel 8. The arrangements for driving the takeup reel 8 and for guiding the tape 9 are not shown as they are conventional. The tape 9 may be the usual plastic base recording tape, or 35 mm. film coated with a magnetic layer.

The input device 2 includes a time clock, or other timing mechanism, which generates signals at intervals of, say, 5 minutes. With intermittent motion of the tape 9 these timing signals are applied to a driving mechanism for the capstan, 6, as indicated by line 10, to cause the capstan 6 to move the tape 9 a small predetermined distance in the direction of the arrow, on the occurrence of each timing signal. At the same time, a signal representing the current value to be recorded is read out by the input device 2 to the head 4, to record a corresponding signal on the tape 9. With continuous motion the input device 2 reads out a signal to head 4 to record a timing signal on the tape, whilst the data pulses are recorded as they occur. The head 4 may be a multiple unit so that, say, 10 parallel tracks may be recorded on the tape 9. The input line 1 may carry a number of signals corresponding to different variables, each track being allocated to the recording of one of the variables.

Figure 2:
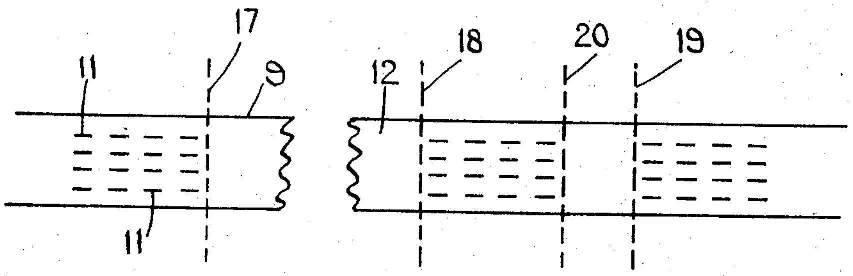
FIG. 2 is a schematic illustration of part of two recording tapes.

A portion of the tape 9 is shown diagrammatically in FIG. 2. Each mark 11 represents an area of magnetic recording which records the value of one variable at one particular time interval. Any convenient form by which a value is recorded within an area may be adopted. For example, the length of the recorded area may represent the value, or the area may contain a binary pulse pattern. Thus, the marks 11 within a row correspond to the value of a variable at successive time intervals, and the marks within a column correspond to the values of different variables at the same time.

When it becomes necessary to load a new tape 12 into the recorder, the switch 3 is set to its other position. The signals from the input unit 1 are now fed to the input of a store 13, instead of to the head 4. The store 13 has a capacity at least sufficient to hold all the data which can be read out from the unit 2 during the period required for changing the tape. For example, assuming that data is recorded at 5 minute intervals, the store 13 would accept three separate sets of data if a maximum period of 12 minutes is allowed for removing the old tape, threading up the new tape and returning the recorder to service.

The store 13 may employ any of the conventional storage devices which is appropriate to the quantity and form of the data which is to be stored. For example, the store may consist of a plurality of counters, or shift registers, which are set by the signals from the input unit. If a substantial quantity of data is to be stored, the store may take the form of a small magnetic core matrix. The timing signals may be applied over lines 14 and 15 from the input unit to the store to control the proper registration of the data in the store.

When the tape exchange has been completed, and the recorder is once more ready for service, the switch 3 is returned to its original position. The next timing signal will cause current data values to be recorded by the head 4 on the new tape 12. At the same time, the timing signal is applied to the store over lines 14 and 16 to cause the first set of data values which was received by the store 13 to be read out for recording by the head 7. The end of recording on the old tape 9 is indicated by line 17 (FIG. 2). The start of recording of the stored data on the new tape 12 is indicated by line 18, and of the incoming data by line 19. The simultaneous recording of the stored data and the incoming data continues under control of the timing signals, until all the stored data has been recorded. The end of the recording of the stored data is indicated by line 20.

It will be appreciated that the distance between the heads 4 and 7 must be greater than the distance between the lines 18 and 20, so that the recording of the stored data does not overlap the recording of the incoming data. It will be clear from FIG. 2 that, despite the tape exchange, no data has been lost and that all the recordings are in the correct sequence on the pair of tapes, so that subsequent processing of the recorded data is not affected.

It will be appreciated that the switch 3 may consist of relay contacts, or an electronic switch, and that the switch may be operated automatically by, for example, an "end of tape" signal from the recorder. If the recording time is a substantial part of the timing interval, it is desirable to provide an electrical interlock, controlled by the timing signals, which prevents effective operation of the switch 3 whilst data recording is occuring.

Although the invention has been described in relation to magnetic data recording, it is equally applicable to other forms of recording. For example, the magnetic recording tape may be replaced by paper tape, and the recording heads 4 and 7 may be replaced by conventional tape punching units.

We claim:

1. Data recording apparatus for recording input data including an exchangeable recording medium, means for feeding the medium past spaced first and second recording means, a data store connected to the second recording means, means for applying the input data to the store during the period when a new recording medium is being exchanged for an old recording medium, and means for causing the stored data and input data to be recorded concurrently on the new medium by said second and first recording means, respectively, said data store being capable of storing all the input data which occurs during the period in which the medium is exchanged, and said recording means being spaced downstream of the first recording means by such a distance that the stored data is recorded without overlapping the recording of the input data.

2. An apparatus as claimed in claim 1 in which said means for normally applying data to said first recording means includes a data input device which produces timing signals over an output line.

3. An apparatus as claimed in claim 2 including means connected to said output to selectively apply said timing signals to a first input of said store to read out data for recording by the second recording device, and to a second input of the store to allow data to be written in the store during an exchange of recording media.

4. An apparatus as claimed in claim 1 in which the exchangeable recording is continuously moved past the first and second recording means.

5. An apparatus as claimed in claim 1 in which said exchangeable recording medium is incrementally moved past said first and second recording means.

* * * * *